United States Patent Office 3,415,909
Patented Dec. 10, 1968

3,415,909
PROCESS OF PREPARING N-(β-DIALKYL-
DITHIOPHOSPHORYL) ARYL OR ALKYL
SULFONAMIDES
Raymond A. Simone, Walnut Creek, and Roy C. Tulee,
San Francisco, Calif., assignors to Stauffer Chemical
Company, New York, N.Y., a corporation of Delaware
No Drawing. Continuation-in-part of application Ser. No.
403,383, Oct. 12, 1964. This application Aug. 15, 1967,
Ser. No. 660,585
8 Claims. (Cl. 260—979)

ABSTRACT OF THE DISCLOSURE

Process for preparing N-(β-dialkyldithiophosphoryl) aryl or alkyl sulfonamides by the reaction of an aryl or alkyl sulfonamidethyl halide with a dialkyldithiophosphate salt, the improvement maintaining a pH of at least about 9.5 during the reaction, and thereafter isolating the N-(β-dialkyldithiophosphoryl) aryl or alkyl sulfonamide. The N-(β-dialkyldithiophosphoryl) aryl or alkyl sulfonamides are herbicides.

---

This application is a continuation-in-part of copending application Ser. No. 403,383, filed Oct. 12, 1964, now abandoned.

This invention relates to an improved process for the preparation of certain sulfonamides including N-(β-dialkyldithiophosphorylethyl) aryl or alkyl sulfonamides. More particularly, it relates to an improved process for preparing N-(β-dialkyldithiophosphorylethyl) aryl or alkyl sulfonamides of high yields and product purity. Still more particularly, it relates to a highly efficient process for making the above-referenced products.

The sulfonamides produced in accordance with the process of this invention are particularly effective as selective herbicides.

The known methods of preparation of the subject compounds of the present invention involve the condensation of an alkyl or aryl sulfonamidethyl halide, usually the chloride, with a dialkyldithiophosphate salt. U.S. Patent 3,205,253 discloses the production of certain arylsulfonamides in the presence of catalytic amounts of amines and dimethylformamide. The use of tertiary amines and dimethylformamide as promoters in the condensation reaction creates many problems in recovery and recycle in large scale operations. Although the reaction is facilitated by the use of such promoters, the known processes involving their use are, unfortunately, inefficient. It is, therefore, the principal object of the present invention to overcome and eliminate difficulties inherent in making certain sulfonamides and to provide a novel and efficient process therefor.

An object of the present invention is to provide a new and improved process for preparing N-(β-dialkyldithiophosphoryl) aryl or alkyl sulfonamides.

More specifically, an object of the invention is provision of a process for preparing said sulfonamides in a rapid and economical manner by an improved reaction.

These and other objects are generally accomplished in accordance with the process of the present invention by carrying out the condensation reaction of an aryl or alkyl sulfonamidethyl halide with a dialkyldithiophosphate salt at a pH of at least about 9.5 to produce the desired N-(β-dialkyldithiophosphorylethyl) aryl or alkyl sulfonamide. This invention, in its broadest aspect is predicated upon the discovery that, under otherwise comparable conditions, carrying out the reaction at a pH of 10, for example, results in a surprising and unexpected improvement in product yield and purity as compared with carrying out the reaction at a pH equal to 9. That is to say, there appears to be a wholly unexpected and substantial improvement at a pH level expressed as at least about 9.5.

In a preferred embodiment of the process of the present invention, the pH of at least about 9.5 is achieved by introducing into the reaction medium an effective quantity of a compound selected from the group consisting of an alkali metal hydroxide, alkaline earth metal hydroxide and salts of weak acids. In still another embodiment of the present invention, it has been discovered that the desired pH level is maintained by having present an effective quantity of the reaction intermediate, benzenesulfonylethylenimine.

Preferred basis for use in the present invention includes hydroxides of sodium, potassium and calcium. The most preferred base comprises sodium hydroxide. Preferred alkaline earth bases include hydroxides of calcium and barium. Preferred salts of weak acids include the alkali metal salts of phosphoric acid, carbonic acid, boric acid, acetic acid, mono or polyhydric alcohols. Representative additional specific compounds are, e.g. sodium phosphate, sodium carbonate, potassium acetate, sodium methoxide and the like.

In the process of the invention, starting with the corresponding aryl or alkyl sulfonamidethyl halide, the condensation with the selected phosphate salt is initiated by the addition of a suitable quantity of the desired pH controlling substance such as, e.g. one of the bases hereinbefore set forth, to bring the pH of the dissolved mixture to a desirable level. After a short induction period the reaction becomes self-sustaining. The reaction is represented by the general equation:

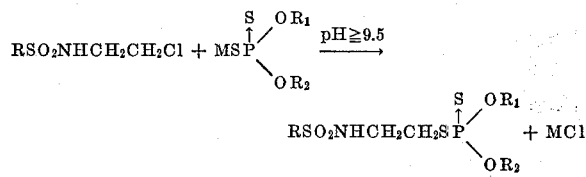

wherein R is aryl, substituted aryl, alkyl or substituted alkyl, M is sodium, potassium and ammonium, $R_1$ and $R_2$ are lower alkyls, phenyl or substituted phenyls. The β-chloro intermediate is indicated in the above reaction merely because of its economic significance. However, the β-bromo and β-iodo intermediates also yield the equivalent phosphate derivatives.

Broadly considered, the nature of the alkyl or aryl moiety of the starting material, either in the sulfonamidethyl halide or phosphate salt is not limited in respect to carbon content and substitution. It is only necessary that the compound be stable in the presence of the solvents and reagents used and at the temperatures employed to carry out the reaction.

In the process of this invention the desired pH level of the solution wherein the condensation reaction takes place is obtained by means of various basic or base producing substances added in sufficient quantity to produce a pH in the range of at least about 9.5. As will be made more apparent from the description which follows, the reaction does not proceed efficiently at a pH less than about 9.5 in the reaction mixture. Substances and methods of producing the required pH level are well known to those skilled in the chemical arts.

Changes in solvents will affect reaction rates much in the same way as they effect equilibria conditions. It should be noted that a variation in solvents may change not only the rate of the reaction but also its apparent order. The completeness of the reaction is dependent upon the type of solvent used. In general, the presence of a polar solvent facilitates the reaction. The reaction is generally conducted with two phases present. An organic phase is used as a solvent for the aryl or alkyl sulfonamidethyl halide and subsequently as a solvent for the final condensation product. An aqueous or polar phase is used as a solvent in introducing the dialkyldithiophosphate salt and when required as a solvent for the alkalinity source. When carrying out the reaction, the degree of completion is determined by the volume increase of the organic phase which contains the product. Generally, benzene or toluene are used as the organic solvents. Isolation can be accomplished by normal means of separating, drying and removing the solvent.

In carrying out the present invention an aqueous solution of dithiophosphate salt is added to a solution of aryl or alkyl sulfonamidethylhalide at room temperature. The mixture is then stirred to provide phase mixing and is heated to approximately 70° C. Actually, the condensation reaction will take place at any temperature between about 25° C. and 70° C. The latter temperature is near reflux for the reaction mixture when benzene is used as the organic solvent. At 70° C., which is the preferable reaction temperature, a solution of the alkaline producing material is added to induce the reaction. The reaction then becomes self-sustaining by internally generating sufficient alkalinity at a pH level of at least about 9.5 to continue the condensation in accordance with the present invention. Within five to fifteen minutes the reaction approaches completion; however, heating and agitation are continued for up to one hour in order to insure complete reaction. The ratio in which the reactants are used is not critical. The preferred range of reactants is at least 1 mole of alkali metal or ammonium dialkyldithiophosphate salt to 1 mole of aryl or alkyl sulfonamidethyl halide. The particularly preferred range is 1 to 2 moles of alkali metal or ammonium dialkyldithiophosphate salt for each equivalent of sulfonamidethyl halide. A slight excess of the dithiophosphate is desirable.

The following non-limiting examples illustrate the process of this invention.

Example 1

Into a 3-liter three-necked glass reaction flask equipped with a reflux condenser, thermometer and a dropping funnel is added 1 mole (219.7 g.) of recrystallized (β-chloroethyl)-benzenesulfonamide, 1.17 moles (276.5 g.) of 44% by weight of a water solution of sodium, O,O-diisopropyldithiophosphate and 660 milliliters of benzene. The reaction flask is heated with stirring to 70° C. To the heated reactants is added dropwise 16.0 g. of a 25 percent aqueous solution of sodium hydroxide. There is observed an immediate color change to a lighter color. Upon stopping the stirring action it is noted that the upper benzene layer has increased in volume, approximately 20 percent. The mixture is stirred and heated at 70° to 72° C. for about one hour. The contents of the reaction flask are then cooled to 25° C. and the pH at this point reads 12.55. The pH is lowered to approximately 8 by the addition of concentrated sulfuric acid. The phases are separated by conventional means and the lower aqueous phase is discarded. The upper organic phase is washed twice with 300 ml. of water. The benzene is then dried over anhydrous magnesium sulfate, filtered and the solvent removed on a steam bath. There is obtained 393.0 g. of a clear yellow-colored viscous liquid, $n_D^{30}$ 1.5441. Purity by paper chromatography analysis shows 99% N-(β-diisopropyldithiophosphorylethyl) benzene sulfonamide. The yield is 99.0 percent of theoretical (397.1 g.).

The following Table 1 illustrates the effect of pH on quality and yield of N-(β-diisopropyldithiophosphorylethyl) benzene sulfonamide.

TABLE 1

| pH | Yield (percent) by— | Purity (percent) by— |
| --- | --- | --- |
| 9.0 | 72.5 | 60 |
| 10.0 | 96.5 | 97 |
| 11.0 | 99.2 | 98 |
| 12.0 | 95.0 | 97 |

The following Table 2 lists typical results obtained by using varying amounts of sodium hydroxide per mole of reactant (β-chloroethyl)benzene sulfonylamine.

TABLE 2

| Experiment | Mole NaOH per mole of (β-chloroethyl)-benzenesulfonamide | Percent weight yield | Percent purity |
| --- | --- | --- | --- |
| 1 | 0.10 | 99.0 | 99.0 |
| 2 | 1.00 | 95.5 | 90.5 |
| 3 | 0.70 | 95.9 | 99.0 |
| 4 | 0.40 | 92.0 | 95.0 |
| 5 | 0.30 | 97.5 | 95.7 |
| 6 | 0.08 | 98.4 | 99.5 |
| 7 | 0.00 | No reaction | |

Example 2

This example illustrates the use of trisodium phosphate as an alkaline source for the process of the present invention.

In equipment similar to that mentioned in Example 1, 0.25 mole of (β-chloroethyl) benzenesulfonamide in 160 ml. of benzene are added to 0.292 mole (125.0 g.) 55.4 percent aqueous solution of sodium O,O-diisopropyldithiophosphate at 25° C. The dithio salt solution is adjusted to a pH of 7.2. To this is added enough saturated trisodium phosphate solution to obtain a pH of 11.0. The mixture is heated and stirred to reflux at 70° C. After heating for several minutes at 70° C. the benzene layer increases noticeably. Heating is continued for one hour to insure complete reaction. After cooling the reaction mixture to 25° C. the pH is adjusted with hydrochloric acid to 7.5 and then phase separation is accomplished. The organic layer is washed twice with hot water. The benzene is dried and evaporated to obtain 95.3 g. of the product. The purity is 98.0 percent.

Although the examples employ (β-chloroethyl) benzene-sulfonamide, other substituted phenyl derivatives can be employed. Such examples are chlorophenyl, halophenyl, nitrophenyl, tolyl, haloalkylphenyl, alkoxyphenyl and the like. The use of such substituted (β-haloethyl) sulfonamides is contemplated within the scope of the process of the present invention.

Various changes and modifications may be made in the process described herein as will be apparent to those skilled in the chemical arts. It is accordingly intended that the present invention only be limited by the scope of the claims.

We claim:
1. In a process for the preparation of compounds according to the formula

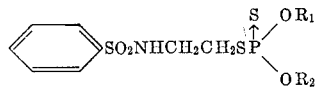

wherein $R_1$ and $R_2$ are lower alkyls, by the condensation reaction of a phenylsulfonamidethyl halide and a dialkyldithiophosphate, the improvement which comprises maintaining a pH of at least about 9.5 during the reaction, and thereafter isolating a product according to the above stated formula.

2. The process of claim 1 in which the pH is maintained by introducing a base selected from the group consisting of alkali metal alkaline earth metal hydroxides and salts of weak acids.

3. The process of claim 2 in which said alkali metal hydroxide comprises sodium hydroxide.

4. The process of claim 2 in which said salt of a weak acid comprises trisodium phosphate.

5. The process of claim 1 in which the pH is maintained by having present an effective quantity of the reaction intermediate, benzenesulfonylethylenimine.

6. The process of claim 1 in which the reaction temperature is maintained between about 25° C. and about 75° C.

7. Process for the preparation of the compound N-(β-diisopropyldithiophosphorylethyl) benzenesulfonamide, comprising the condensation of N-(β-chloroethyl) benzenesulfonamide with sodium diisopropyldithiophosphate at a temperature between about 25° C. and about 75° C. in the presence of sodium hydroxide at a pH maintained at a level of at least about 9.5 in the reaction mixture.

8. In a process for the preparation of compounds corresponding to the formula

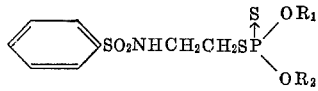

wherein $R_1$ and $R_2$ are lower alkyls, from the corresponding starting compounds

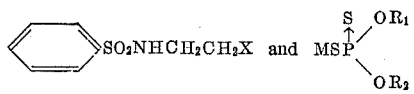

wherein X is halogen, M is selected from the group consisting of sodium, potassium and ammonium, and $R_1$ and $R_2$ are lower alkyls, the improvement which comprises maintaining a pH of at least about 9.5 during the reaction, and thereafter isolating a product compound corresponding to the above stated formula.

References Cited

UNITED STATES PATENTS

| | | | |
|---|---|---|---|
| 2,627,523 | 2/1953 | Hook et al. | 260—979 XR |
| 2,977,382 | 3/1961 | Millikan | 260—979 |
| 3,299,189 | 1/1967 | Millikan et al | 260—979 XR |

CHARLES B. PARKER, *Primary Examiner.*

A. H. SUTTO, *Assistant Examiner.*

U.S. Cl. X.R.

71—87; 260—239, 944